(12) United States Patent
Srinivas et al.

(10) Patent No.: US 9,120,181 B2
(45) Date of Patent: Sep. 1, 2015

(54) SINGULATION OF LAYERED MATERIALS USING SELECTIVELY VARIABLE LASER OUTPUT

(75) Inventors: Ramanujapuram A. Srinivas, San Jose, CA (US); Michael Greenberg, Santa Rosa, CA (US); David Gaudiosi, Rohnert Park, CA (US); Michael Mielke, Santa Rosa, CA (US); Tim Booth, Penngrove, CA (US)

(73) Assignee: COHERENT, INC., Santa Clara, CA (US)

( * ) Notice: Subject to any disclaimer, the term of this patent is extended or adjusted under 35 U.S.C. 154(b) by 812 days.

(21) Appl. No.: 13/234,795

(22) Filed: Sep. 16, 2011

(65) Prior Publication Data

US 2012/0152915 A1 Jun. 21, 2012

Related U.S. Application Data (60) Provisional application No. 61/383,691, filed on Sep. 16, 2010.

(51) Int. Cl.
*B23K 26/40* (2014.01)
*B23K 26/36* (2014.01)

(52) U.S. Cl.
CPC .............. *B23K 26/409* (2013.01); *B23K 26/36* (2013.01); *B23K 26/4085* (2013.01)

(58) Field of Classification Search
CPC ........... B23K 26/0613; B23K 26/0617; B23K 26/0604; B23K 26/0643; B23K 26/0648; B23K 26/38; B23K 26/4085; B23K 26/409
USPC ............ 219/121.67, 121.72, 121.73, 121.74, 219/121.76, 121.77
See application file for complete search history.

(56) References Cited

U.S. PATENT DOCUMENTS

| | | | |
|---|---|---|---|
| 3,549,256 A | 12/1970 | Brienza et al. | |
| 3,764,641 A | 10/1973 | Ash | |
| 3,808,549 A | 4/1974 | Maurer | |
| 3,851,267 A | 11/1974 | Tanner | |
| 3,963,953 A | 6/1976 | Thornton, Jr. | |

(Continued)

FOREIGN PATENT DOCUMENTS

| | | |
|---|---|---|
| EP | 0214100 | 3/1987 |
| EP | 0691563 | 1/1996 |

(Continued)

OTHER PUBLICATIONS

Machine translation of Japan Patent Document No. 5-104,276, May 2014.*

(Continued)

*Primary Examiner* — Geoffrey S Evans
(74) *Attorney, Agent, or Firm* — Morrison & Foerster LLP (57) ABSTRACT

Systems and methods for processing, selectively ablating, and singulating layered materials. According to some embodiments, methods for selectively ablating a layered material may include selectively varying a wavelength of at least a portion of a primary ultrafast laser beam to create a secondary ultrafast laser beam with a second wavelength, the primary ultrafast laser beam being configured to ablate a layer of the layered material, the secondary ultrafast laser beam being configured to ablate an additional layer of the layered material and applying the first and second ultrafast laser beams to the layered material to create a singulated product.

20 Claims, 5 Drawing Sheets

(56) References Cited

U.S. PATENT DOCUMENTS

| | | | |
|---|---|---|---|
| 4,194,813 | A | 3/1980 | Benjamin et al. |
| 4,319,119 | A * | 3/1982 | Runge .................... 219/121.85 |
| 4,449,215 | A | 5/1984 | Reno |
| 4,743,769 | A | 5/1988 | Schwaiger et al. |
| 4,750,809 | A | 6/1988 | Kafka et al. |
| 4,829,529 | A | 5/1989 | Kafka |
| 4,913,520 | A | 4/1990 | Kafka |
| 4,928,316 | A | 5/1990 | Heritage et al. |
| 4,972,423 | A | 11/1990 | Alfano et al. |
| 4,983,034 | A | 1/1991 | Spillman, Jr. |
| 5,095,487 | A | 3/1992 | Meyerhofer et al. |
| 5,162,643 | A | 11/1992 | Currie |
| 5,166,818 | A | 11/1992 | Chase et al. |
| 5,187,759 | A | 2/1993 | DiGiovanni et al. |
| 5,204,517 | A | 4/1993 | Cates et al. |
| 5,233,182 | A | 8/1993 | Szabo et al. |
| 5,255,117 | A | 10/1993 | Cushman |
| 5,265,107 | A | 11/1993 | Delfyett, Jr. |
| 5,265,114 | A | 11/1993 | Sun et al. |
| 5,286,941 | A | 2/1994 | Bel |
| 5,302,835 | A | 4/1994 | Bendett et al. |
| 5,400,350 | A | 3/1995 | Galvanauskas |
| 5,430,572 | A | 7/1995 | DiGiovanni et al. |
| 5,440,573 | A | 8/1995 | Fermann |
| 5,450,427 | A | 9/1995 | Fermann et al. |
| 5,489,984 | A | 2/1996 | Hariharan et al. |
| 5,493,096 | A | 2/1996 | Koh |
| 5,533,139 | A | 7/1996 | Parker et al. |
| 5,572,358 | A | 11/1996 | Gabl et al. |
| 5,595,668 | A | 1/1997 | Madden et al. |
| 5,617,434 | A | 4/1997 | Tamura et al. |
| 5,625,544 | A | 4/1997 | Kowshik et al. |
| 5,627,848 | A | 5/1997 | Fermann et al. |
| 5,633,885 | A | 5/1997 | Galvanauskas et al. |
| 5,656,186 | A | 8/1997 | Mourou et al. |
| 5,681,490 | A | 10/1997 | Chang |
| 5,689,361 | A | 11/1997 | Damen et al. |
| 5,689,519 | A | 11/1997 | Fermann et al. |
| 5,701,319 | A | 12/1997 | Fermann |
| 5,720,894 | A | 2/1998 | Neev et al. |
| 5,726,855 | A | 3/1998 | Mourou et al. |
| 5,778,016 | A | 7/1998 | Sucha et al. |
| 5,786,117 | A | 7/1998 | Hoshi et al. |
| 5,790,574 | A | 8/1998 | Rieger et al. |
| 5,815,519 | A | 9/1998 | Aoshima et al. |
| 5,818,630 | A | 10/1998 | Fermann et al. |
| 5,833,759 | A | 11/1998 | Haslow et al. |
| 5,841,099 | A | 11/1998 | Owen et al. |
| 5,847,863 | A | 12/1998 | Galvanauskas et al. |
| 5,862,287 | A | 1/1999 | Stock et al. |
| 5,867,304 | A | 2/1999 | Galvanauskas et al. |
| 5,875,408 | A | 2/1999 | Bendett et al. |
| 5,880,877 | A | 3/1999 | Fermann et al. |
| 5,898,485 | A | 4/1999 | Nati, Jr. |
| 5,903,662 | A | 5/1999 | DeCarlo |
| 5,907,157 | A | 5/1999 | Yoshioka et al. |
| 5,923,686 | A | 7/1999 | Fermann et al. |
| 5,933,271 | A | 8/1999 | Waarts et al. |
| 6,014,249 | A | 1/2000 | Fermann et al. |
| 6,020,591 | A | 2/2000 | Harter et al. |
| 6,034,975 | A | 3/2000 | Harter et al. |
| 6,061,373 | A | 5/2000 | Brockman et al. |
| 6,075,220 | A | 6/2000 | Essien et al. |
| 6,091,749 | A | 7/2000 | Hoffmaster et al. |
| 6,122,097 | A | 9/2000 | Weston et al. |
| 6,156,030 | A | 12/2000 | Neev |
| 6,168,590 | B1 | 1/2001 | Neev |
| 6,175,437 | B1 | 1/2001 | Diels et al. |
| 6,198,766 | B1 | 3/2001 | Schuppe et al. |
| 6,211,485 | B1 | 4/2001 | Burgess |
| 6,228,748 | B1 | 5/2001 | Anderson et al. |
| 6,246,816 | B1 | 6/2001 | Moore et al. |
| 6,256,328 | B1 | 7/2001 | Delfyett et al. |
| 6,269,108 | B1 | 7/2001 | Tabirian et al. |
| 6,275,250 | B1 | 8/2001 | Sanders et al. |
| 6,281,471 | B1 | 8/2001 | Smart |
| 6,314,115 | B1 | 11/2001 | Delfyett et al. |
| 6,327,074 | B1 | 12/2001 | Bass et al. |
| 6,327,282 | B2 | 12/2001 | Hammons et al. |
| 6,330,383 | B1 | 12/2001 | Cai et al. |
| 6,334,011 | B1 | 12/2001 | Galvanauskas et al. |
| 6,335,821 | B1 | 1/2002 | Suzuki et al. |
| 6,344,625 | B1 | 2/2002 | Kim et al. |
| 6,371,469 | B1 | 4/2002 | Gray |
| 6,400,871 | B1 | 6/2002 | Minden |
| 6,418,154 | B1 | 7/2002 | Kneip et al. |
| 6,421,169 | B1 | 7/2002 | Bonnedal et al. |
| 6,425,912 | B1 | 7/2002 | Knowlton |
| 6,433,301 | B1 | 8/2002 | Dunsky et al. |
| 6,549,547 | B2 | 4/2003 | Galvanauskas et al. |
| 6,552,301 | B2 | 4/2003 | Herman et al. |
| 6,562,698 | B2 | 5/2003 | Manor |
| 6,566,888 | B1 | 5/2003 | Bruce et al. |
| 6,567,431 | B2 | 5/2003 | Tabirian et al. |
| 6,570,704 | B2 | 5/2003 | Palese |
| 6,583,381 | B1 | 6/2003 | Duignan |
| 6,592,574 | B1 | 7/2003 | Shimmick et al. |
| 6,593,753 | B2 | 7/2003 | Scott et al. |
| 6,614,565 | B1 | 9/2003 | Klug et al. |
| 6,621,040 | B1 | 9/2003 | Perry et al. |
| 6,661,568 | B2 | 12/2003 | Hollemann et al. |
| 6,661,816 | B2 | 12/2003 | Delfyett et al. |
| 6,671,298 | B1 | 12/2003 | Delfyett et al. |
| 6,723,991 | B1 | 4/2004 | Sucha et al. |
| 6,728,273 | B2 | 4/2004 | Perry |
| 6,738,144 | B1 | 5/2004 | Dogariu |
| 6,744,552 | B2 | 6/2004 | Scalora et al. |
| 6,744,555 | B2 | 6/2004 | Galvanauskas et al. |
| 6,760,356 | B2 | 7/2004 | Erbert et al. |
| 6,785,303 | B1 | 8/2004 | Holzwarth et al. |
| 6,787,733 | B2 | 9/2004 | Lubatschowski et al. |
| 6,801,557 | B2 | 10/2004 | Liu |
| 6,804,574 | B2 | 10/2004 | Liu et al. |
| 6,819,702 | B2 | 11/2004 | Sverdlov et al. |
| 6,822,187 | B1 | 11/2004 | Hermann et al. |
| 6,822,251 | B1 | 11/2004 | Arenberg et al. |
| 6,885,683 | B1 | 4/2005 | Fermann et al. |
| 6,915,040 | B2 | 7/2005 | Willner et al. |
| 6,998,569 | B2 | 2/2006 | Schumacher |
| 7,001,373 | B2 | 2/2006 | Clapham et al. |
| 7,002,733 | B2 | 2/2006 | Dagenais et al. |
| 7,072,101 | B2 | 7/2006 | Kapteyn et al. |
| 7,088,756 | B2 | 8/2006 | Fermann et al. |
| 7,095,772 | B1 | 8/2006 | Delfyett et al. |
| 7,116,688 | B2 | 10/2006 | Sauter et al. |
| 7,233,607 | B2 | 6/2007 | Richardson et al. |
| 7,257,302 | B2 | 8/2007 | Fermann et al. |
| 7,289,707 | B1 | 10/2007 | Chavez-Pirson et al. |
| 7,344,671 | B2 | 3/2008 | Basque et al. |
| 7,349,589 | B2 | 3/2008 | Temelkuran et al. |
| 7,414,780 | B2 | 8/2008 | Fermann et al. |
| 7,444,049 | B1 | 10/2008 | Kim et al. |
| 7,518,788 | B2 | 4/2009 | Fermann et al. |
| 7,674,719 | B2 | 3/2010 | Li et al. |
| 7,675,674 | B2 | 3/2010 | Bullington et al. |
| 7,751,118 | B1 | 7/2010 | Di Teodoro et al. |
| 7,759,607 | B2 | 7/2010 | Chism, II |
| 7,773,216 | B2 | 8/2010 | Cheng et al. |
| 7,773,294 | B2 | 8/2010 | Brunet et al. |
| 7,787,175 | B1 | 8/2010 | Brennan, III et al. |
| 7,792,408 | B2 | 9/2010 | Varming |
| 7,847,213 | B1 | 12/2010 | Anikitchev |
| 2001/0009250 | A1 | 7/2001 | Herman et al. |
| 2002/0003130 | A1 | 1/2002 | Sun et al. |
| 2002/0051606 | A1 | 5/2002 | Takushima et al. |
| 2002/0071454 | A1 | 6/2002 | Lin |
| 2002/0097761 | A1 | 7/2002 | Sucha et al. |
| 2002/0115273 | A1 | 8/2002 | Chandra et al. |
| 2002/0118934 | A1 | 8/2002 | Danziger et al. |
| 2002/0162973 | A1 | 11/2002 | Cordingley et al. |
| 2002/0167581 | A1 | 11/2002 | Cordingley et al. |
| 2002/0167974 | A1 | 11/2002 | Kennedy et al. |
| 2002/0169379 | A1 | 11/2002 | Camacho et al. |
| 2003/0031410 | A1 | 2/2003 | Schnitzer |

(56) References Cited

U.S. PATENT DOCUMENTS

| | | |
|---|---|---|
| 2003/0122550 A1 | 7/2003 | Kanamaru et al. |
| 2003/0129423 A1 | 7/2003 | Mastromatteo et al. |
| 2003/0161365 A1 | 8/2003 | Perry et al. |
| 2003/0178396 A1 | 9/2003 | Naumov et al. |
| 2003/0180569 A1* | 9/2003 | Hamann et al. ......... 219/121.71 |
| 2003/0189959 A1 | 10/2003 | Erbert et al. |
| 2003/0205561 A1 | 11/2003 | Iso |
| 2004/0000942 A1 | 1/2004 | Kapteyn et al. |
| 2004/0022695 A1 | 2/2004 | Simon et al. |
| 2004/0042061 A1 | 3/2004 | Islam et al. |
| 2004/0069754 A1 | 4/2004 | Bates et al. |
| 2004/0108811 A1* | 6/2004 | Klausmann et al. .......... 313/512 |
| 2004/0128081 A1 | 7/2004 | Rabitz et al. |
| 2004/0134894 A1 | 7/2004 | Gu et al. |
| 2004/0134896 A1 | 7/2004 | Gu et al. |
| 2004/0160995 A1 | 8/2004 | Sauter et al. |
| 2004/0226922 A1 | 11/2004 | Flanagan |
| 2004/0226925 A1 | 11/2004 | Gu et al. |
| 2004/0233944 A1 | 11/2004 | Dantus et al. |
| 2004/0263950 A1 | 12/2004 | Fermann et al. |
| 2005/0001166 A1 | 1/2005 | Sanzari |
| 2005/0029238 A1* | 2/2005 | Chen ........................ 219/121.71 |
| 2005/0067388 A1 | 3/2005 | Sun et al. |
| 2005/0074974 A1 | 4/2005 | Stoltz |
| 2005/0105865 A1 | 5/2005 | Fermann et al. |
| 2005/0107773 A1 | 5/2005 | Bergt et al. |
| 2005/0163426 A1 | 7/2005 | Fermann et al. |
| 2005/0167405 A1 | 8/2005 | Stoltz et al. |
| 2005/0175280 A1 | 8/2005 | Nicholson |
| 2005/0213630 A1 | 9/2005 | Mielke et al. |
| 2005/0215985 A1 | 9/2005 | Mielke et al. |
| 2005/0218122 A1 | 10/2005 | Yamamoto et al. |
| 2005/0225846 A1 | 10/2005 | Nati et al. |
| 2005/0226278 A1 | 10/2005 | Gu et al. |
| 2005/0226287 A1 | 10/2005 | Shah et al. |
| 2005/0236378 A1 | 10/2005 | Boyle et al. |
| 2005/0255715 A1 | 11/2005 | Cheng et al. |
| 2005/0271094 A1 | 12/2005 | Miller et al. |
| 2005/0274702 A1 | 12/2005 | Deshi |
| 2006/0050750 A1 | 3/2006 | Barty |
| 2006/0064079 A1 | 3/2006 | Stoltz et al. |
| 2006/0081101 A1 | 4/2006 | Hayashi et al. |
| 2006/0091125 A1 | 5/2006 | Li et al. |
| 2006/0093265 A1 | 5/2006 | Jia et al. |
| 2006/0096426 A1* | 5/2006 | Park ................................. 83/13 |
| 2006/0096962 A1 | 5/2006 | Park |
| 2006/0120418 A1 | 6/2006 | Harter et al. |
| 2006/0126679 A1 | 6/2006 | Brennan, III et al. |
| 2006/0128073 A1 | 6/2006 | Sun et al. |
| 2006/0131288 A1 | 6/2006 | Sun et al. |
| 2006/0159137 A1 | 7/2006 | Shah |
| 2006/0187974 A1 | 8/2006 | Dantus |
| 2006/0201983 A1 | 9/2006 | Kusama et al. |
| 2006/0209908 A1 | 9/2006 | Pedersen et al. |
| 2006/0210275 A1 | 9/2006 | Vaissie et al. |
| 2006/0221449 A1 | 10/2006 | Glebov et al. |
| 2006/0237397 A1 | 10/2006 | Yamazaki et al. |
| 2006/0249816 A1 | 11/2006 | Li et al. |
| 2006/0268949 A1 | 11/2006 | Gohle et al. |
| 2007/0012665 A1 | 1/2007 | Nelson et al. |
| 2007/0025728 A1 | 2/2007 | Nakazawa et al. |
| 2007/0047965 A1 | 3/2007 | Liu et al. |
| 2007/0064304 A1 | 3/2007 | Brennan et al. |
| 2007/0084837 A1 | 4/2007 | Kosmowski |
| 2007/0098025 A1 | 5/2007 | Hong et al. |
| 2007/0121686 A1 | 5/2007 | Vaissie et al. |
| 2007/0151961 A1* | 7/2007 | Kleine et al. ............. 219/121.72 |
| 2007/0166965 A1* | 7/2007 | Tanaka et al. ................. 438/487 |
| 2007/0196048 A1 | 8/2007 | Galvanauskas et al. |
| 2007/0215581 A1* | 9/2007 | Kato et al. ............... 219/121.69 |
| 2007/0229939 A1 | 10/2007 | Brown et al. |
| 2007/0235418 A1* | 10/2007 | Park et al. .................. 219/121.6 |
| 2007/0273960 A1 | 11/2007 | Fermann et al. |
| 2008/0029152 A1 | 2/2008 | Milshtein et al. |
| 2008/0050078 A1 | 2/2008 | Digonnet et al. |
| 2008/0058781 A1 | 3/2008 | Langeweyde et al. |
| 2008/0076233 A1* | 3/2008 | Morishige et al. ............. 438/463 |
| 2008/0157656 A1* | 7/2008 | Liao et al. ..................... 313/504 |
| 2008/0232407 A1 | 9/2008 | Harter et al. |
| 2008/0240184 A1 | 10/2008 | Cho et al. |
| 2008/0264910 A1 | 10/2008 | Kashyap et al. |
| 2009/0020511 A1 | 1/2009 | Kommera et al. |
| 2009/0045176 A1* | 2/2009 | Wawers et al. ........... 219/121.67 |
| 2009/0061724 A1 | 3/2009 | Cok et al. |
| 2009/0151996 A1* | 6/2009 | Mishima et al. ......... 219/121.71 |
| 2009/0189159 A1 | 7/2009 | Enicks et al. |
| 2009/0219610 A1 | 9/2009 | Mourou et al. |
| 2009/0244695 A1 | 10/2009 | Marcinkevicius et al. |
| 2009/0245302 A1 | 10/2009 | Baird et al. |
| 2009/0257464 A1 | 10/2009 | Dantus et al. |
| 2009/0273828 A1 | 11/2009 | Waarts et al. |
| 2009/0290151 A1 | 11/2009 | Agrawal et al. |
| 2009/0297155 A1 | 12/2009 | Weiner et al. |
| 2010/0013036 A1 | 1/2010 | Carey |
| 2010/0032416 A1 | 2/2010 | Jeong et al. |
| 2010/0040095 A1 | 2/2010 | Mielke et al. |
| 2010/0072183 A1 | 3/2010 | Park |
| 2010/0089882 A1 | 4/2010 | Tamura |
| 2010/0118899 A1 | 5/2010 | Peng et al. |
| 2010/0142034 A1 | 6/2010 | Wise et al. |
| 2010/0181284 A1 | 7/2010 | Lee et al. |
| 2010/0240155 A1 | 9/2010 | Chang et al. |
| 2011/0049765 A1 | 3/2011 | Li et al. |
| 2011/0100967 A1 | 5/2011 | Yoo et al. |
| 2011/0284510 A1 | 11/2011 | Reeves-Hall et al. |
| 2011/0287607 A1* | 11/2011 | Osako et al. .............. 219/121.72 |
| 2012/0000893 A1 | 1/2012 | Broude et al. |
| 2012/0152915 A1 | 6/2012 | Srinivas et al. |
| 2012/0156875 A1* | 6/2012 | Srinivas et al. ........... 219/121.72 |

FOREIGN PATENT DOCUMENTS

| | | | |
|---|---|---|---|
| EP | 1462831 | | 9/2004 |
| GB | 2331038 A | * | 5/1999 |
| GB | 2331038 A | * | 12/1999 |
| JP | 5-104276 A | * | 4/1993 |
| JP | 06-114577 A | * | 4/1994 |
| JP | 06-170822 A | * | 6/1994 |
| JP | 8171103 | | 7/1996 |
| JP | 11189472 | | 7/1999 |
| JP | 2000-343261 A | * | 12/2000 |
| JP | 2002-224873 A | * | 8/2002 |
| JP | 2003181661 | | 7/2003 |
| JP | 2003344883 | | 12/2003 |
| JP | 2004066322 A | | 3/2004 |
| JP | 2005174993 | | 6/2005 |
| JP | 2005-205446 A | * | 8/2005 |
| WO | WO9428972 | | 12/1994 |
| WO | 0229853 A2 | | 4/2002 |
| WO | WO2004105100 | | 12/2004 |
| WO | WO2004114473 | | 12/2004 |
| WO | WO2005018060 | | 2/2005 |
| WO | WO2005018061 | | 2/2005 |
| WO | WO2005018062 | | 2/2005 |
| WO | WO2005018063 | | 2/2005 |
| WO | WO-2007/000194 A1 | * | 1/2007 |
| WO | WO2007034317 | | 3/2007 |
| WO | WO-2009/115484 A1 | * | 9/2009 |

OTHER PUBLICATIONS

Vaissie et al, "Desktop Ultra-short Pulse laser at 1552nm" ,Raydiance, Directed Energy Professional Society (DEPS), Sep. 2006, unmarked pages (slides) 1-27.*

Machine translation of Japan Patent No. 6-114,577, Nov. 2014.*

Siegman, "Unstable Optical Resonators", Applied Optics, Feb. 1974, pp. 353-367, vol. 13, No. 2.

Stevenson et al., Femtosecond Optical Transfection of Cells: Viability and Efficiency, Optics Express, vol. 14, No. 16, pp. 7125-7133, Aug. 7, 2006.

Stock et al., "Chirped Pulse Amplification in an Erbium-doped fiber Oscillator/Erbium-doped Fiber Amplifier System", Optics Communications, North-Holland Publishing Co., Amsterdam, NL, vol. 106, (56) References Cited

OTHER PUBLICATIONS

No. 4/5/06, Mar. 15, 1994, pp. 249-252, XP000429901, ISSN: 0030-4018.
Strickland et al., "Compression of Amplified Chirped Optical Pulses", Optics Communications, North-Holland Publishing Co., Amersterdam, NL, vol. 56, No. 3, Dec. 1, 1985, pp. 219-221, XP024444933 ISSN: 0030-4018 (retrieved on Dec. 11, 1985.
Temelkuran, B. et al., "Wavelength-scalable Hollow Optical Fibres with Large Photonic Bandgaps for CO2 Laser Transmission," Nature, Dec. 12, 2002, pp. 650-653.
Thurston, R.N. et al., "Analysis of Picosecond Pulse Shape Synthesis by Spectral Masking in a Grating Pulse Compressor," IEEE Journal of Quantum Electronics, vol. EQ-22, No. 5, pp. 682-696, May 1986.
Tirlapur et al., "Targeted Transfection by Femtosecond Laser," Nature Publishing Group, vol. 418, pp. 290-291, Jul. 18, 2002.
Tsai et al., "Ultrashort Pulsed Laser Light," Optics & Photonics News, pp. 25-29, Jul. 2004.
Vaissie et al., "Desktop Ultra-Short Pulse Laser at 1552 nm,"Ultrashort Pulse Laser Materials Interaction Workshop (Raydiance)—Directed Energy Professional Society (DEPS), Sep. 28, 2006.
Weiner, A.M. et al., "Synthesis of Phase-coherent, Picosecond Optical Square Pulses," Optics Letters, vol. 11, No. 3, pp. 153-155, Mar. 1986.
Weiner, A.M., "High-resolution femtosecond Pulse Shaping," Journal of the Optical Society of America B. vol. 5, No. 8, pp. 1563-1572, Aug. 1988.
Wells, D.J., "Gene Therapy Progress and Prospects: electroporation and Other Physical Methods," Gene Therapy, Nature Publishing Group, vol. 11, pp. 1363-1369, Aug. 5, 2004, (http://www.nature.com/gt).
White, W.E., et al., "Compensation of Higher-order Frequency-dependent Phase Terms in Chirped-pulse Amplification Systems," Optics Letters, vol. 18, No. 16, pp. 1343-1345, Aug. 15, 1993.
Yamakawa et al., "1 Hz, 1 ps, terawatt Nd: glass laser", Optics Communications, North-Holland Publishing Co. Amsterdam, NL, vol. 112, No. 1-2, Nov. 1, 1994, pp. 37-42, XP024424285.
Yeh, et al. "Theory of Bragg Fiber", Journal of the Optical Society America, Sep. 1978, pp. 1196, vol. 68, No. 9., pp. 1196-1201.
Yi, Y. et al., "Sharp Bending of On-Chip silicon Bragg Cladding Waveguide With Light Guiding on Low Index Core Materials", IEEE Journal of Selected Topics in Quantum Electronics, vol. 12, No. 6, Nov./Dec. 2006, pp. 1345-1348.
Yi, Y., et al., "On-chip Si-based Bragg Cladding Waveguide with High Index Contrast Bilayers", Optics Express, vol. 12, No. 20, Oct. 4, 2004, pp. 4775-4780.
Yin, D. et al., "Integrated ARROW Waveguides with Hollow Cores", Optics Express, vol. 12, No. 12, Jun. 14, 2004, pp. 2710-2715.
Zhou, S. et al., "Compensation of nonlinear Phase Shifts with Third-order Dispersion in Short-pulse Fiber Amplifiers," Optics Express, vol. 13, No. 13, pp. 4869-2877, Jun. 27, 2005.
Agostinelli, J. et al., "Optical Pulse Shaping with a Grating Pair," Applied Optics, vol. 18, No. 14, pp. 2500-2504, Jul. 15, 1979.
Anastassiou et al., "Photonic Bandgap Fibers Exploiting Omnidirectional Reflectivity Enable Flexible Delivery of Infrared Lasers for Tissue Cutting," Proceedings of the SPIE—the International Society for Optical Engineering, SPIE, US, vol. 5317, No. 1, Jan. 1, 2004, pp. 29-38, XP002425586 ISSN: 0277-786X.
Benoit, G. et al., "Dynamic All-optical Tuning of Transverse Resonant Cavity Modes in Photonic Bandgap Fibers, "Optics Letters, vol. 30, No. 13, Jul. 1, 2005, pp. 1620-1622.
Chen, X. et al., "Highly Birefringent Hollow-core Photonic Bandgap Fiber," Optics Express, vol. 12, No. 16, Aug. 9, 2004, pp. 3888-3893.
Chen, Y. et al., "Dispersion-Managed Mode Locking", Journal of the Optical Society of America B, Nov. 1999, pp. 1999-2004, vol. 16, No. 11, Optical Society of America.
Dasgupta, S. et al., "Design of Dispersion-Compensating Bragg Fiber with an Ultrahigh Figure of Merit," Optics Letters, Aug. 1, 2005, vol. 30, No. 15, Optical Society of America.

De Matos et al., "Multi-kilowatt, Picosecond Pulses from an All-fiber Chirped Pulse Amplification System Using Air-core Photonic Bandgalp Fiber", Lasers and Electro-optics, 2004, (CLEO), Conference on San Francisco, CA USA, May 20-21, 2004, Piscataway, NJ, USA, IEEE, vol. May 17, 2004, pp. 973-974, XP010745448 ISBN: 978-1-55752-777-6.
De Matos, C.J.S. et al., "All-fiber Chirped Pulse Amplification using Highly-dispersive Air-core Photonic Bandgap Fiber," Nov. 3, 2003, Optics Express, pp. 2832-2837, vol. 11, No. 22.
Delfyett, P. et al., "Ultrafast Semiconductor Laser-Diode-Seeded Cr:LiSAF Rengerative Amplifier System", Applied Optics, May 20, 1997, pp. 3375-3380, vol. 36, No. 15, Octoical Society of America.
Eggleton, et al., "Electrically Tunable Power Efficient Dispersion Compensating Fiber Bragg Grating," IEEE Photonics Technology Letters, vol. 11, No. 7, pp. 854-856, Jul. 1999.
Engeness et al., "Dispersion Tailoring and Compensation by Modal Interations in Omniguide Fibers," Optics Express, May 19, 2003, pp. 1175-1196, vol. 11, No. 10.
Fink et al., "Guiding Optical Light in Air Using an All-Dielectric Structure," Journal of Lightwave Technology, Nov. 1999, pp. 2039-2041, vol. 17, No. 11.
Folkenberg, J.R., et al., "Broadband Single-polarization Photonic Crystal Fiber," Optics Letters, vol. 30, No. 12, Jun. 15, 2005, pp. 1446-1448.
Folkenberg, J.R., et al., "Polarization Maintaining Large Mode Area Photonic Crystal Fiber," Optics Express vol. 12, No. 5, Mar. 8, 2004, pp. 956-960.
Futami, F., et al., "Wideband Fibre Dispersion Equalisation up to Fourth-order for Long-distance Sub-picosecond Optical Pulse Transmission," Electronics Letters, vol. 35, No. 25, Dec. 9, 1999.
Galvanauskas, A. et al., "Chirped-pulse-amplification Circuits for Fiber Amplifiers, Based on Chirped-period Quasi-phase, matching gratings", Optics Letters, Nov. 1, 1998, p. 1695-1697, vol. 23, No. 21, Optical Society of America.
Hartl et al., "In-line high energy Yb Fiber Laser Based Chirped Pulse Amplifier System", Laser and Electro-Optics, 2004, (CLEO) Conference of San Francisco, CA USA May 20-21, 2004, Piscataway, NJ, USA, IEEE, vol. 1, May 17, 2004, pp. 563-565, XP010745382, ISBN: 978-1-55752-777-6.
Hellstrom, E. et al., "Third-order Dispersion Compensation Using a Phase Modulator", Journal of Lightwave Technology, vol. 21, No. 5, pp. 1188-1197, May 2003.
Heritage, J. P. et al., "Picosecond Pulse Shaping by Spectral Phase and Amplitude Manipulation," Optics Letters, vol. 10, No. 12, pp. 609-611, Dec. 1985.
Heritage, J.P. et al., "Spectral Windowing of Frequency-Modulated Optical Pulses in a Grating Compressor," Applied Physics Letters, vol. 47, No. 2, pp. 87-89, Jul. 15, 1985.
Hill, K. et al., "Fiber Bragg Grating Technology Fundamentals and Overview," Journal of Lightwave Technology, Aug. 1997, vol. 15, No. 8, pp. 1263-1276.
Jiang, et al., "Fully Dispersion Compensated ~500 fs Pulse Transmission Over 50 km Single Mode Fiber," Optics Letters, vol. 30, No. 12, pp. 1449-1451, Jun. 15, 2005.
Jiang, et al., "Fully Dispersion Compensated ~500 fs Pulse Transmission Over 50 km Single Mode Fiber," Purdue University ECE Annual Research Summary, Jul. 1, 2004-Jun. 30, 2005.
Killey, et al., "Electronic Dispersion Compensation by Signal Predistortion Using Digital Processing and a Dual-Drive Mach-Zehnder Modulator," IEEE Photonics Technology Letters, vol. 17, No. 3, pp. 714-716, Mar. 2005.
Kim, K. et al., "1.4kW High Peak Power Generation from an All Semiconductor Mode-locked Master Oscillator Power Amplifier System Based on eXtreme Chirped Pulse Amplification (X-CPA)", Optics Express, Jun. 2, 2005, pp. 4600-4606, vol. 13, No. 12.
Koechner, "Solid State Laser Engineering", Oct. 29, 1999, Section 5.5, pp. 270-277, 5th Edition, Springer.
Kwon, et al., "Tunable Dispersion Slope Compensator Using a Chirped Fiber Bragg Grating Tuned by a Fan-shaped Thin Metallic Heat Channel," IEEE Photonics Technology Letters, vol. 18, No. 1, pp. 118-120, Jan. 1, 2006.
Kyungbum, Kim et al., "1.4kW High Peak Power Generation from an all Semiconductor Mode-locked Master Oscillator Power Amplifier (56) References Cited

OTHER PUBLICATIONS

System Based on eXtreme Chirped Pulse Amplification (X-CPA)", Optics Express, Jun. 2, 2005, pp. 4600-4606, vol. 13, No. 12.
Levy et al., "Engineering Space-Variant Inhomogeneous Media for Polarization Control," Optics Letters, Aug. 1, 2004, pp. 1718-1720, vol. 29, No. 15, Optical Society of America.
Liao, Kai-Hsiu et al., "Large-aperture Chirped Volume Bragg Grating Based Fiber CPA System, "Optics Express, Apr. 16, 2007, vol. 15, No. 8, pp. 4876-4882.
Limpert et al., "All Fiber Chiped-Pulse Amplification System Based on Compression in Air-Guiding Photonic Bandgap Fiber", Optics Express, Dec. 1, 2003, vol. 11, No. 24, pp. 3332-3337.
Lo, S. et al., "Semiconductor Hollow Optical Waveguides Formed by Omni-directional Reflectors", Optics Express, vol. 12, No. 26, Dec. 27, 2004, pp. 6589-6593.
Malinowski A. et al., "Short Pulse High Power Fiber Laser Systems," Proceedings of the 2005 Conference on Lasers and Electro-Optics (CLEO), Paper No. CThG3, pp. 1647-1649, May 26, 2005.
Mohammed, W. et al., "Selective Excitation of the TE01 Mode in Hollow-Glass Waveguide Using a Subwavelength Grating," IEEE Photonics Technology Letters, Jul. 2005, vol. 17, No. 7, IEEE.
Nibbering, E.T.J., et al. "Spectral Determination of the Amplitude and the Phase of Intense Ultrashort Optical Pulses," Journal Optical Society of America B, vol. 13, No. 2, pp. 317-329, Feb. 1996.
Noda, J. et al., "Polarization-maintaining Fibers and Their Applications", Journal of Lightwave Technology, vol. Lt-4, No. 8 Aug. 1986, pp. 1071-1089.

Palfrey et al., "Generation of 16-FSEC Frequency-tunable Pulses by Optical Pulse compression" Optics Letters, OSA, Optical Society of america, Washington, DC, USA, vol. 10, No. 11, Nov. 1, 1985, pp. 562-564, XP000710358 ISSN: 0146-9592.
Pelusi, M. et al., "Electrooptic Phase Modulation of Stretched 250-fs Pulses for Suppression of Third-Order Fiber Disperson in Transmission", IEEE Photonics Technology Letters, vol. 11, No. 11, Nov. 1999, pp. 1461-1463.
Pelusi, M.D., et al., "Phase Modulation of Stretched Optical Pulses for Supression of Third-order Dispersion Effects in fibre Transmission," Electronics Letters, vol. 34, No. 17, pp. 1675-1677, Aug. 20, 1998.
Price et al., "Advances in High Power, Short Pulse, Fiber Laser Systems and Technology", Photonics West 2005, San Jose, California, Jan. 2005, pp. 5709-3720.
Price et al., "Advances in High Power, Short Pulse, Fiber Laser Systems and Technology", Proceedings of SPIE—vol. 5709, Fiber Lasers II: Technology, Systems, and Applications, Apr. 2005, pp. 184-192.
Resan et al., "Dispersion-Managed Semiconductor Mode-Locked Ring Laser", Optics Letters, Aug. 1, 2003, pp. 1371-1373, vol. 28, No. 15, Optical Society of America.
Schreiber, T., et al., "Stress-induced Single-polarization Single-transverse Mode Photonic Crystal Fiber with Low Nonlinearity," Optics Express, vol. 13, No. 19, Sep. 19, 2005, pp. 7621-7630.

* cited by examiner

SINGULATION OF LAYERED MATERIALS USING SELECTIVELY VARIABLE LASER OUTPUT

CROSS-REFERENCE TO RELATED APPLICATION

This non-provisional patent application claims the priority benefit of U.S. provisional patent application No. 61/383,691, filed on Sep. 16, 2010 and titled "Semiconductor Processing using Lasers"—which is hereby incorporated by reference in its entirety.

BACKGROUND

Field of the Invention

The present technology relates generally to laser processing. More specifically, the present technology relates to systems and methods for laser processing of layered materials.

SUMMARY

According to some embodiments, the present technology may be directed to methods for selectively ablating a layered material. These methods may include (a) selectively varying a wavelength of at least a portion of a fundamental ultrafast laser beam to create one or more secondary ultrafast laser beams, each of the one or more secondary ultrafast laser beams having a unique wavelength, the fundamental ultrafast laser beam being configured to ablate a layer of the layered material, the one or more secondary ultrafast laser beams being configured to ablate additional layers of the layered material and (b) applying at least one of the one or more secondary ultrafast laser beams and the fundamental ultrafast laser beam to the layered material to create a singulated product.

According to additional embodiments, the present technology may be directed to systems for selectively ablating layers of a layered material. The systems may include (a) at least one laser emitting source for emitting two or more ultrafast laser beams; (b) a beam delivery assembly for delivering the two or more ultrafast laser beams to the layered material, the beam delivery assembly comprising: (i) an optical subassembly for selectively varying the focal point of each of the two or more laser beams in such a way that each of the two or more ultrafast laser beams ablate different layers of the layered material, wherein the two or more ultrafast laser beams have different harmonic wavelengths relative to one another.

According to other embodiments, the present technology may be directed to systems for system for singulating a layered material. The systems may include (a) a laser emitting source for emitting a primary laser beam having a fundamental wavelength; (b) a beam splitter for diverting a portion of the laser beam into a harmonic converter that converts the portion of the laser beam into a secondary laser beam, the secondary laser beam having a wavelength that is a harmonic of the fundamental wavelength; and (c) a laser combiner that receives the primary laser beam and the secondary laser beam and aligns the primary laser beam and the secondary laser beam in a substantially collinear relationship to one another.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

The present technology relates generally to laser processing of layered materials, and more specifically, but not by way of limitation, to systems and methods that singulate layered materials via selectively adjustable ultrafast laser output. Exemplary systems may utilize beam delivery systems that separate a portion of a fundamental output into one or more harmonics thereof and apply the fundamental output along with one or more harmonics to process different layers of a layered material.

Generally speaking, the present technology may perform substrate plasma dicing, wafer scribing, shockwave induced cleaving, and generate coating features to enhance light source ability during processing. Also, the present technology is broadly directed to systems and methods that process (e.g., singulate, etch, mill, ablate, and so forth) layered materials by selectively ablating individual layers with ultrafast laser beam(s) that may be tailored to ablate individual layers based upon their physical attributes (e.g., physical properties such as density, opacity, crystalline structure, molecular components, and so forth). For example, the ultrafast laser beams may include different wavelengths relative to one another. In some embodiments, the different wavelengths may be harmonics of a fundamental wavelength. Each harmonic wavelength may be utilized to pass the laser beam through some types of materials, producing no effect, while ablating other types of materials.

Additionally, the present technology may also utilize one or more beam delivery assemblies that divide at least a portion of ultrafast laser pulses ("USPs"), also known as a fundamental beam (e.g., fundamental output), into one or more secondary beams. As stated above, these secondary beams may be harmonics of the wavelength of the fundamental beam. In some embodiments, the fundamental beam may be calibrated (e.g., having fine tuned laser parameters based upon physical attributes of a layer of material) to ablate a device or substrate layer of a layered material. In other embodiments, the one or more harmonic beams may be calibrated to ablate one or more getter layers of a layered material. It will be understood that the combined application of the fundamental beam and the one or more secondary beams may be utilized to singulate, dice, divide, separate, and so forth, a stock layered material into separated products. For example, the present technology may be utilized to dice individual semiconductor wafers from a larger wafer.

The laser beams disclosed above may also be utilized to create features within the diced product. For example, a resultant diced wafer may include features such as device structures that have been processed to receive an electrical component therein, such as a microprocessor, a sensor, an energy storage device, a communications device, or an electrical conductor for electrically coupling one or more of the electrical devices within the wafer. One of ordinary skill in the art will appreciate that the above-described list of electrical components is not limiting and other electrical components may also be utilized in accordance with the present disclosure.

The present technology may direct both the fundamental beam and the one or more harmonic beams at a layered device in such a way that the beams cooperate in a seamless fashion. That is, the present technology may successively or iteratively ablate through each layer of the material using one or more of the different types of laser beams. The successive application of each type of laser output may occur substantially simultaneously to one another to enhance the throughput of the present technology. The beam delivery assemblies of the present technology may align multiple ultrafast laser beams together in a substantially collinear manner such that the application of one ultrafast laser beam may immediately follow the application of another ultrafast laser beam.

According to some embodiments, the present technology may include a process flow that combines an ultrafast laser (for pattern generation and underlayer etching) and a dry etch process for subsequent processing through the remainder of the substrate. The extent to which either process can be deployed is 0-100%. Hence, dicing may be accomplished via application of ultrafast laser beams or via a plasma reactor after the pattern has been exposed to one or more ultrafast laser beams.

Dicing wafers prior to packaging has become an area of focus in the semiconductor industry. Additionally, performance scaling (relative to manufacturing of devices) may require the creation of thinner wafers having increasingly complex materials and device stacks. Dicing these wafers is increasingly becoming a bottleneck for throughput and yield.

Semiconductor wafers may be diced using the present technology. An uppermost surface of the layered material may be coated with a layer such as a resist that serves as a masking layer. In some embodiments, an ultrafast laser beam is then used to open the resist layer in a pattern that defines the streets (e.g., device structures or features) to be diced. It is noteworthy to mention that the ultrafast laser beam may have a wavelength that is a harmonic of a wavelength of a primary ultrafast laser beam that may be utilized to ablate features into one or more device layers.

In other embodiments, the ultrafast laser beam may define feature patterns and scribe through some of the layers. Rather than singulation via application of an additional ultrafast laser beam, the wafer may be subsequently etched in a dry etch chamber to cut through the remainder of the layered material (often the substrate layer). In some cases, the wafer may be mounted on a tape. Further etching processes may be utilized to etch through layers of the tape. In some cases, the layered material may be again subjected to an ultrafast laser beam for cutting through the layers on the tape.

Advantageously, ultrafast lasers produced by the present technology can ablate materials without incident thermal damage. Also, combining USP laser scribing with a dry etch dicing process enables high throughput (50%~200% higher) in an area where most processes have to be slowed down to account for materials complexity. Most approaches use lasers either for pattern definition prior to sawing or just use lasers for the entire cutting process. Typically, pattern generation can be accomplished through a photo-lithography process, but the costs are usually prohibitive. Pattern transfer then occurs though multiple etch steps to etch through various device and substrate layers. Systems and methods for photo-lithography may also require significant fabrication footprint (e.g., many devices, systems, and processes) and capital investment.

According to the present technology, multiple ultrafast laser beams generated by single or multiple sources can be deployed to enable substantially parallel processing of features, either on the same or different workstations. For example, an exemplary system may utilize different laser devices that each generates an ultrafast laser beam with particular operating parameters. Each of the ultrafast laser beams may have a unique wavelength, along with other unique parameters, as discussed in greater detail herein.

In other embodiments, a single laser may be utilized. A portion of the fundamental output (a first or primary ultrafast laser beam) of the single laser may be divided into one or more harmonics (e.g., different laser parameters) and then applied to the layered material.

Advantages of the present technology include overall cost (higher wafers out) reductions, higher device density (by enabling tighter streets) yield (cleaner cuts, better die break strength) and scalability (ability to deploy technology for several nodes). The present technology may also enable non-traditional die layouts. For example, a street pattern for a wafer can be programmed into the instructions utilized by a control system that controls various portions of the laser device (e.g., laser emitting source and/or beam delivery assemblies) similarly to a computer numeric control process.

The present technology may utilize combinations of processes (e.g., etch, laser, mechanical, and so forth) or may utilize ultrafast laser beams with selectively variable wavelengths to fully process layered materials. Examples of fully processed materials include diced wafers that have device structures fabricated therein. The process of dicing a wafer from a larger substrate may also be referred to as singulation.

Exemplary uses for the present technology include dicing of substrates that have tightly packed devices, for example semiconductors, light emitting diodes ("LEDs") and display substrates, disk drive heads, and so forth.

Figure 1:
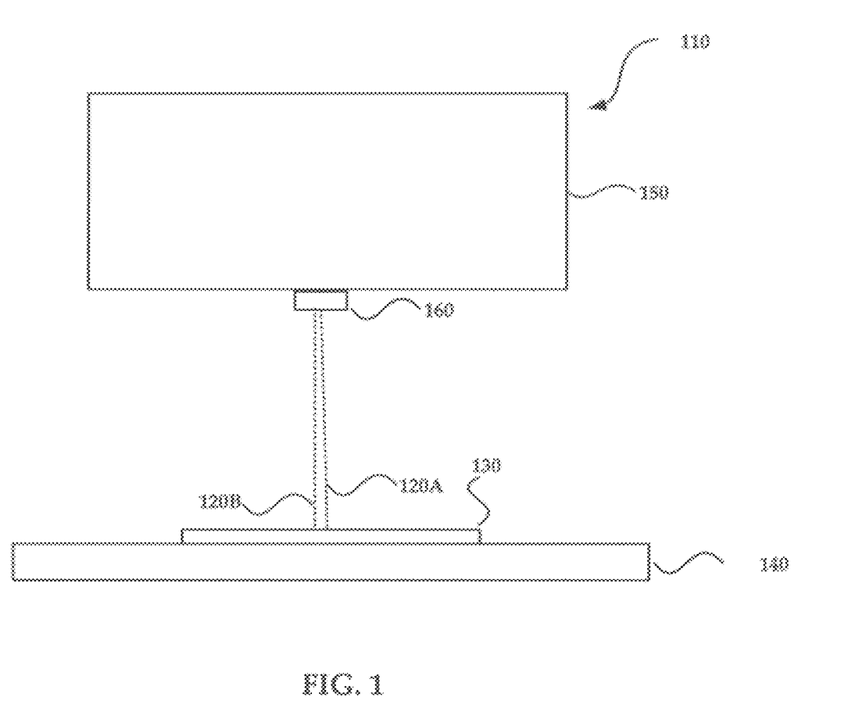
FIG. 1 is a block diagram of an exemplary ultrafast laser device for use in accordance with the present disclosure.

The present technology may be performed by an ultrafast laser which performs ablation on a target component, such as a layered material. FIG. 1A is a block diagram of an exemplary ultrafast laser for use in accordance with the present technology. FIG. 1A includes a laser device 110, a target component 130, and a platform 140. Laser device 110 may direct a primary ultrafast laser beam 120A and a secondary ultrafast laser beam 120B at target component 130 (e.g., layered material) which rests on platform 140. It will be understood that the primary ultrafast laser beam 120A may be applied to a layer of the target component 130 after the application of the secondary ultrafast laser beam 120B to the target component 130. The laser device 110 may direct additional ultrafast laser beams (not shown) at additional layers of the target component 130. It will be understood that the laser parameters of each ultrafast laser beam may be fine tuned to the physical characteristics of the layer to which they are to be applied. Examples of physical attributes include, but are not limited to, opacity and density.

In some embodiments, the primary ultrafast laser beam 120A may have a fundamental wavelength of approximately 1552 nanometers and each additional ultrafast laser beam may include a wavelength that is a harmonic of the primary ultrafast laser beam 120A.

Generally speaking, the laser device 110 may include any laser emitting device that is configured to deliver energy in ultrashort pulses to ablate material. It is noteworthy to mention that the strength of the electric field generated by the beam(s) of the laser device 110 may increase significantly (above the ablation point of the material) such that the target molecules of the material of a layer begin to be ionized and create plasma, in a process known as optical breakdown. Ultimately, these molecules are removed from the material surface, or "ablated," without collateral damage to the remaining material. In contrast to the femtosecond and picosecond ultrafast lasers provided herein, long pulse devices utilize energy waves for ablating material that cause a mix of optical breakdown and traditional thermal processes.

It will be understood that ultrafast lasers produce pulses of light that may be less than a picosecond long in duration. The shortness of the pulses ensures that the ablation process is substantially caused by optical breakdown, while minimizing or eliminating thermal breakdown or degradation. Therefore, precise features may be machined into a variety of materials without introducing heat or thermal irregularities to the materials.

In some applications, the laser device 110 may utilize shock wave inducing, ultrafast laser beams to cause effects such as cleaving, ablating, dividing, separating, milling, cracking, weakening, splitting and so forth, within any layer of a layered material. The ultrafast laser beams may create features such as device structures within a layer. Common examples of device structures may include, but are not limited to, apertures, grooves, channels, or voids having any desired three-dimensional geometrical configuration, size, or volume.

The laser device 110 may include both a laser emitting source 150 and a beam delivery assembly 160. The laser emitting source 150 may include any type of ultrafast laser generating device that can generate laser output having pulse speeds durations selected from any of femtosecond, sub-picosecond and low range picosecond ranges.

As will be discussed in greater detail below, the parameters of the ultrafast laser beam generated by the laser emitting source 150 may be selectively varied by selectively varying any of wavelength, pulse width, pulse energy level, wavelength, laser repetition rate, or combinations thereof. Additionally, selectively varying the operational parameters of the beam delivery assembly 160 may affect parameters such as scan speed, focal point, beam width, fill spacing, and so forth.

The beam delivery assembly 160 may be generally described as comprising optical and/or structural components that are utilized to focus and/or direct the ultrafast laser beam generated by the laser emitting source 150. The construction and operation of beam delivery assemblies would be well known to one of ordinary skill in the art with the present disclosure before them. A detailed discussion of an exemplary beam delivery assembly 160 will be discussed in greater detail with reference to FIG. 2A.

As mentioned above, the ultrafast laser beams generated by the laser device 110 may induce shock waves in layers of a layered material with minimal-to-no heating. The present technology may use these shock waves in a controlled fashion to introduce defects or cracks that can be propagated along a desired direction through subsequent processing (e.g., laser guided, thermal gradients, and/or mechanical stress). The present technology harnesses the high incident energy and athermal nature of the ultrafast laser beams to provide mechanisms for creating features such as device structures within the bulk of crystalline, poly/multi-crystalline and sintered substrates (e.g., layered materials).

These layered materials may be comprised of individual layers of different materials such as silicone (Si), Gallium Arsenide (GaAs), Sapphire, Silicon Carbide (SiC), glass formulations, ceramics, and so forth. By way of non-limiting example, the present technology may process a silicon, glass, or sapphire substrate, by creating a shallow trench (also known as a pilot trench) that may be further processed to create device structures and/or define a zone of cleaving (e.g., an outline or section of the substrate that is to be removed via ultrafast laser beam) prior to final ablation or separation of the substrate to create the device structure.

The pilot trench can be created either using the same laser or by another process/system that may include chemical, laser, or mechanical processes. The high energy ultra-short pulses can then be applied along a tool path to create a pattern of device structures within the layer. In some embodiments, trenching may generate defects or cracks in the defined zone that can be propagated through via subsequent processing. Subsequent processing may include, but is not limited to, dry etching, wet etching, plasma etching, and combinations thereof.

It is noteworthy that material may or may not be removed from a layer during the creation of these defects or cracks. The defects may be designed to induce cracks that are substantially perpendicular or orthogonal to the direction of the trench (e.g., tool path that is defined by the movement of the laser device 110 relative to the target component 130). In other embodiments, such as with the cutting of sapphire wafers (e.g., electrical devices), the present technology may be utilized to process the substrate without a predefining trench.

Advantageously, the present technology may leverage the inherent athermal interaction of the ultrafast laser beams of the laser device 110 with layers of layered material by combining these athermal interactions with other subsequent processes or manufacturing techniques to create high throughput manufacturing processes that enable the proliferation the present technology (such as laser device 110) into high volume manufacturing environments.

Figure 2A:
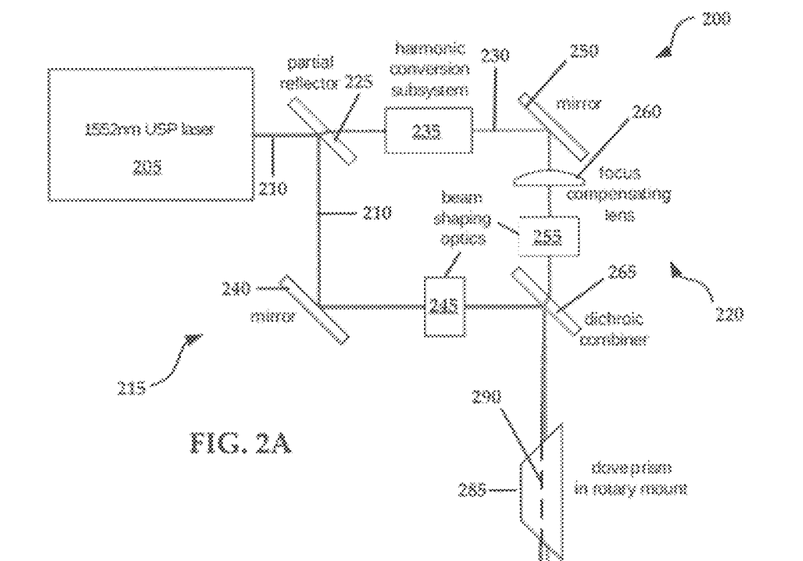
FIG. 2A is a block diagram of an alternative ultrafast laser device that generates a primary beam and a secondary beam that includes a different wavelength relative to the primary beam.
Figure 2B:
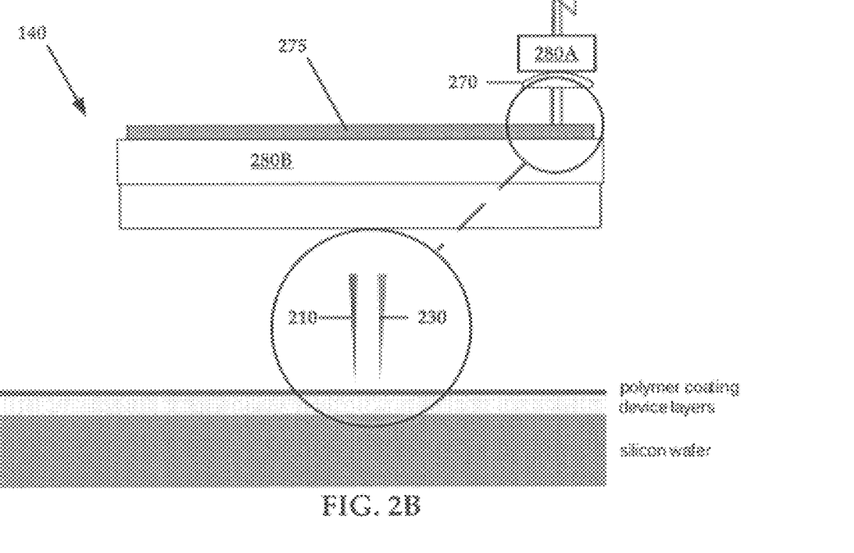
FIG. 2B is an expanded view of the application of the primary and secondary beams to a layered material.

FIG. 2A is a block diagram of an exemplary laser system 200 used for wafer scribing and/or dicing. Generally speaking, the system 200 may divide a portion of the laser system output ("fundamental output") from the main output beam by a partial reflector, creating a secondary laser beam (or additional beams). The present technology may utilize a harmonic conversion subassembly to convert the wavelength of a portion of the primary beam that is a harmonic of the primary beam.

For example, a laser beam with a wavelength that is a harmonic of the primary beam may be more readily absorbed by a getter layer while the primary beam may be more readily absorbed by a device layer or substrate layer. In some embodiments, when the getter layer includes a polymer layer, the harmonic wavelength of the secondary laser may correspond to a green, blue, or ultraviolet wavelength. One of ordinary skill in the art will appreciate that the primary beam may be divided into a plurality of additional harmonic beams, and that the additional beams may also be likewise divided into other harmonics.

The system 200 is shown as generally comprising a laser emitting source 205 that generates a primary ultrafast laser beam 210. The system 200 includes a beam delivery assembly 215 that may include an optical subassembly 220. Other portions of the beam delivery assembly 215 such as mirror mounts or other support structures have been omitted for the purposes of brevity.

The optical subassembly 220 is shown as including a partial reflector 225 that allows a portion of the primary beam 210, ultimately known as the secondary beam 230, to pass through to a harmonic conversion subsystem 235. The harmonic conversion subsystem 235 ("harmonic converter") may convert the portion of the primary beam 210 that passes through the partial reflector 225 from a fundamental wavelength to a harmonic wavelength of the fundamental wavelength. While the example contemplates dividing the primary beam into two beams, the present technology may likewise be utilized to separate the primary beam 210 into additional beams. Each of these beams may include a particular harmonic wavelength of the fundamental wavelength. In other embodiments, the wavelength of the secondary beam 230 may not be different from the primary beam.

The remaining portion of the primary beam 210 that is not directed to the harmonic conversion subsystem 235 may be reflected to a mirror 240, such as a fold mirror. The mirror 240 directs the primary beam 210 to a first beam shaping optics 245 that affect various parameters of the primary beam 210 such as beam width.

A second set of mirror 250 and second beam shaping optics 255 are provided for directing and shaping the secondary beam 230 as it exits the harmonic conversion subsystem 235. In some embodiments a focus compensating lens 260 may be disposed in between the mirror 250 and the second beam shaping optics 255.

It will be understood that the beam shaping optics may selectively adjust the intensity profile of the beams. Examples of intensity profiles include, but are not limited to, top-hat, super-Gaussian, or other desirable intensity profile created at the focal point of the laser beam(s). The primary and secondary beams 210 and 230 are routed with fold mirrors (240 and 250, respectively) to a dichroic combiner 265 that combines the two laser beams into nearly collinear, parallel beams. It will be understood that these collinear beams may be directed along a tool path to create features within a layered material.

Additionally, the present technology may utilize a laser focusing objective 270 to focus the two (or more) laser beams 210 and 230 onto the surface of a silicon wafer 275. The laser focusing objective 270 may be translated by a motion control system 280A. It is noteworthy to mention that a second motion control system 280B may be associated with the platform 140. As such, the platform 140 (and therefore the layered material) and the laser focusing objective 270 may both be independently translatable. The laser focusing objective 270 allows for the alignment of the two laser beams may be adjusted so that the two foci formed by the focusing objective are aligned one behind the other and precisely along the direction of wafer translation (e.g. tool path).

In some applications the wafer 275 initially passes below the focus of the harmonically converted secondary beam 230 whereupon the polymer coating layer is ablated by that laser beam. Subsequently, the wafer 275 passes below the focus of the primary beam 210, whereupon the device layer is ablated by the primary laser beam.

Figure 3:
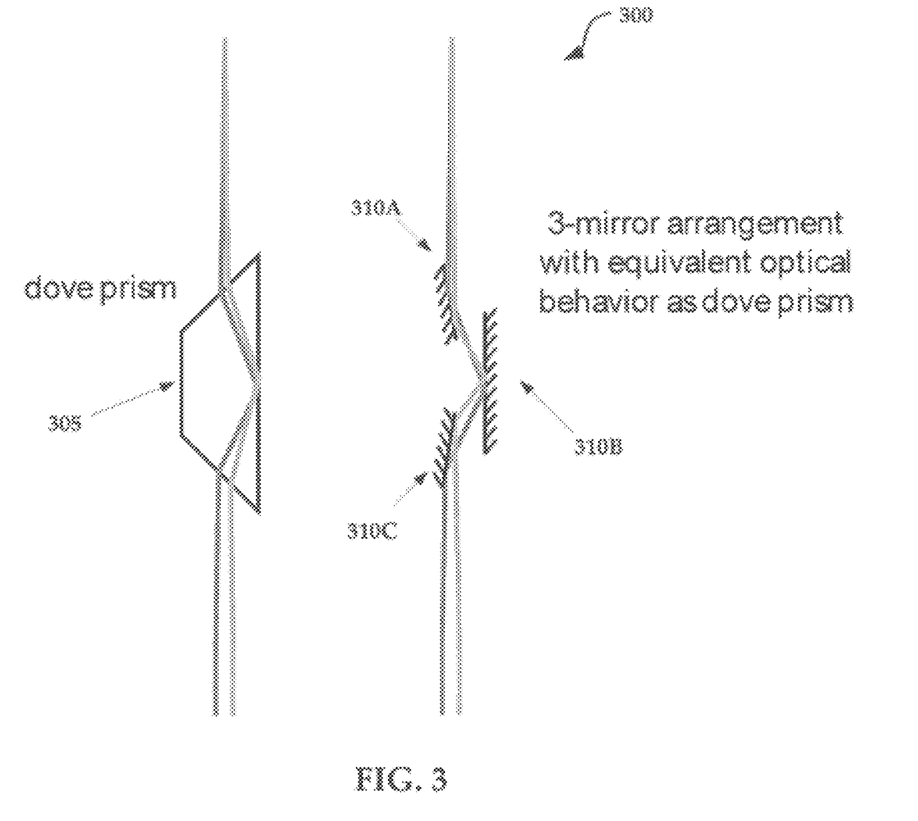
FIG. 3 is a perspective view of a plurality of mirrors that approximate the optical behavior of a dove prism.

According to some embodiments a dove prism 285 (or an arrangement of reflective surfaces that behaves optically in a manner equivalent to that of a dove prism as shown in FIG. 3) may optionally be positioned in the combined optical path of the two beams 210 and 230 after the dichroic combiner 265 but before the laser focusing objective 270. The dove prism 285 may be rotated about a central axis 290 to change the alignment direction of the two laser beam foci so that the translation direction of the wafer 275 can be changed (for example to cut complex shapes or to create laser scribe lines along different directions on the wafer surface) while maintaining precise alignment of the laser foci along a line that is parallel to the direction of wafer motion.

In some embodiments, the laser source is an ultrashort pulsed laser with laser pulse duration of one picosecond or less to enable nonlinear absorption and athermal ablation processes on the wafer 275. In another preferred embodiment, the ultrashort pulsed laser is operated in a 'burst mode' regime emitting bursts of sub-picosecond laser pulses. Each burst of pulses would contain a multitude of individual pulses with a repetition rate in the tens of megahertz, those bursts of pulses being emitted from the laser with a repetition rate in the tens to hundreds of kilohertz.

According to some embodiments, ultrafast laser pulses (such as the primary ultrafast laser beam) may be combined with any additional form of laser source from continuous wave through pulsed lasers and their harmonics, with the combination selected to be deployed simultaneously or in a sequence. For example, a femtosecond laser pulse may be combined within a sub ablation threshold nanosecond pulse for creating faster scribing of materials and/or increased material removal rates.

FIG. 3 illustrates a plurality of mirrors 300 that are arranged in such a way that the plurality of mirrors approximates the optical behavior (optical characteristics) of a dove prism, which is similar to the dove prism 285 of FIG. 2A, when substantially collinear laser beams are directed into the plurality of mirrors 300. The plurality of mirrors 300 may include first and third mirrors 310A and 310C that are disposed substantially coplanar to one another and in vertical alignment. A second mirror 310B may be disposed substantially parallel to and in between the first and third mirrors 310A and 310C. Additionally, the second mirror 310B may be spaced apart from the first and third mirrors 310A and 310C at a predetermined distance.

Figure 4:
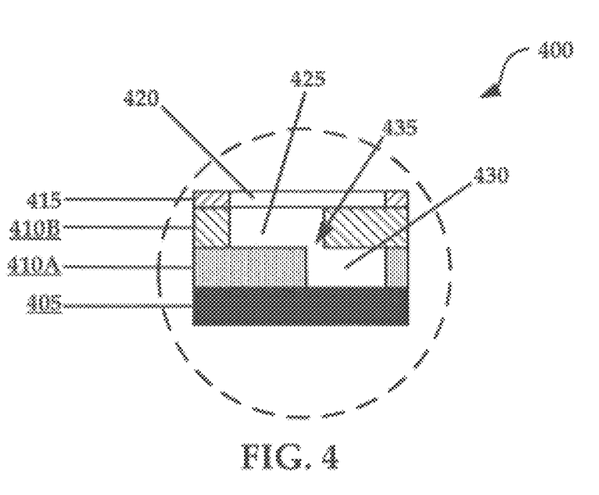
FIG. 4 is an expanded view of the application of ultrafast laser beams to a target component.

FIG. 4 illustrates a singulated layered product 400 that comprises, for example, a base layer 405, one or more device layers (shown herein with a first device layer 410A and second device layer 410B), and one or more getter layers 415 disposed on the uppermost device layer. The base layer 405 may include any organic and/or inorganic material. Common non-limiting examples of base layers include silicon wafers, metals, alloys, hard biological tissues, and so forth. Device layers may include, but are not limited to, glass, ceramics, semiconducting materials, plastics (e.g., polymers, bioplastics, resins, and so forth). Getter layers may be comprised of polymers, metals, and so forth. The term "getter" may also include sacrificial and resist. One of ordinary skill in the art will appreciate that the above description of the layered product 400 is intended to be non-limiting and non exhaustive. That is, the exact numbers, types, and positioning of the various layers may vary greatly depending upon the desired product.

Each of the layers of a layered product 400 were ablated by at least one of a primary and secondary beams generated by either the laser device 110 of FIG. 1 or the laser system 200 of FIG. 2. For the purposes of clarity, the following example will only explicate the use of laser system 200.

Although not shown, a control system may control the operation of the laser emitting source 205 and/or the beam delivery assembly 215. The control system may include a computing system such as computing system 500 described with reference to FIG. 5. The computing system may be particularly purposed to control the operation of the laser system 200 to singulate or otherwise process layered materials. For example, the computing system may include instruction that are stored in memory and executable by a processor of the computing system to control the operation of the laser emitting source 205 and/or the beam delivery assembly 215.

Referring now to FIGS. 2A and 4 collectively, an exemplary layered material 400 is disposed on the platform 140 of the system 200.

A primary beam 210 generated by the laser device 110 may be reflected by the partial reflector 225 and directed by the fold mirror 240 to beam shaping optics 245 and additionally through the dichroic combiner 265. Next, a portion of the primary beam 210 may be directed through the partial reflector 225 into the harmonic conversion subsystem 235 to convert the wavelength of the portion of the primary beam 210 into a harmonic thereof to create a secondary beam 230. It will be understood that the primary beam 210 may be divided according to any percentages desired. For example, the primary beam 210 that passes through the partial reflector 225 and into the harmonic conversion subsystem 235 may include 25% of the total amount the energy of the primary beam 210.

The secondary beam 230 may also be directed into the dichroic combiner 265. The dichroic combiner 265 may align the primary and secondary beams 210 and 230 in a substantially collinear relationship to one another.

In some embodiments, the primary and secondary beams 210 and 230 may pass through the dove prism 285 or plurality of mirrors (see FIG. 3) and a laser focusing objective 270 before application to the layered material. The terms "layered material" may be understood to include the layered product 400 in a pre-fabricated (pre-singulated and/or pre-processed state).

The secondary beam 230 is applied to the layered material to ablate the getter layer 415. In some embodiments, the entire getter layer 415 may be ablated or removed. The ablated portion of the getter layer 155 is shown as void 420.

Ablation of the getter layer exposes a portion of first device layer 410A that is under void 420. The primary beam 210 may be applied to the first device layer 410A to ablate at least a portion of the first device layer 410A to create features therein, such as void 425. These features may include through vias, device structures (e.g., grooves, channels, voids, spaces, and so forth), and the like. It will be understood that these features may have any one of a number of regular or irregular three dimensional geometrical or polygonal configurations.

Next, the primary beam 210 may be applied to the second device layer 410B to ablate at least a portion of the second device layer 410B to create features therein, such as void 430. It will be understood that the features formed in the second layer 430 may be created by focusing the primary beam 210 to a particular depth within the second device layer 410B. That is, it may not be necessary to expose the second device layer 410B by ablating the first device layer 410A, before features may be created in the second device layer 410B. Although it may be necessary to remove additional portions of the getter layer 415 that are disposed directly above the to-be-created features of the second device layer 410B. In this way, device structures of different layers may overlap one another. Additionally, the primary beam 210 may create apertures (such as aperture 435) that extend between device structures of different device layers. These apertures may receive conductive material that electrically couples electrical devices disposed different device layers.

Figure 5:
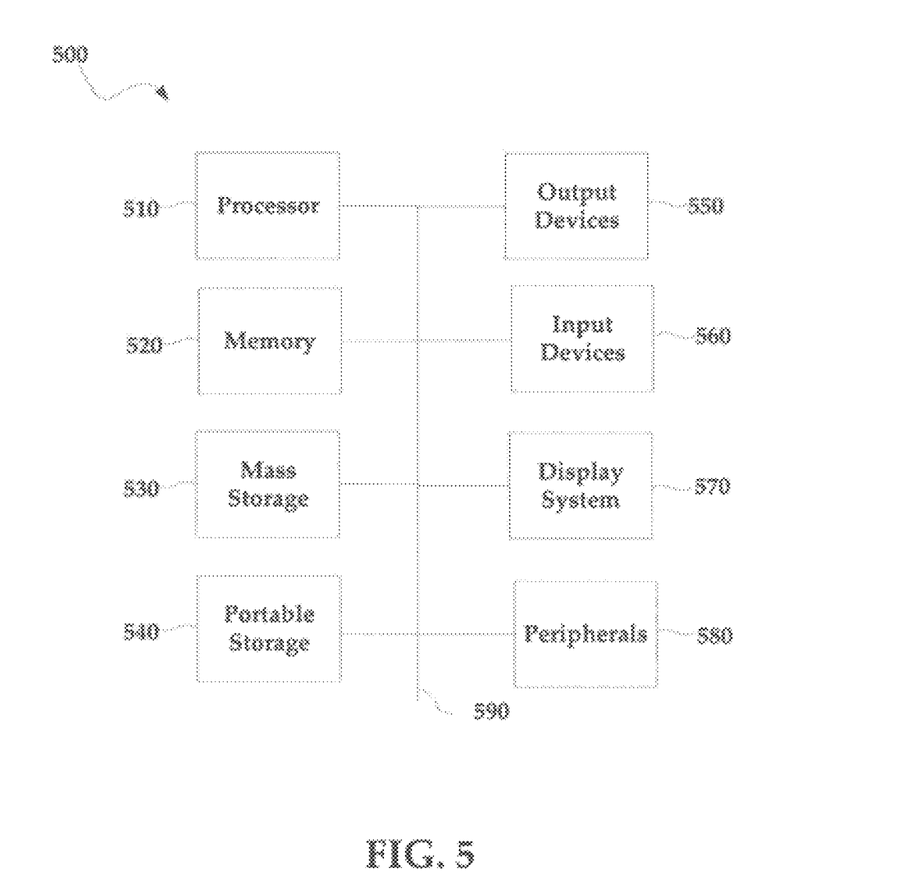
FIG. 5 illustrates an exemplary computing system that may be used to implement embodiments according to the present technology.

FIG. 5 illustrates an exemplary computing system 500 that may be used to implement an embodiment of the present technology. The computing system 500 of FIG. 5 may be implemented in the contexts of the likes of computing systems, networks, servers, or combinations thereof. The computing system 500 of FIG. 5 includes one or more processors 510 and main memory 520. Main memory 520 stores, in part, instructions and data for execution by processor 510. Main memory 520 may store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. The components may be connected through one or more data transport means. Processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 may store the system software for implementing embodiments of the present technology for purposes of loading that software into main memory 520.

Portable storage device 540 operates in conjunction with a portable non-volatile storage medium, such as a floppy disk, compact disk, digital video disc, or USB storage device, to input and output data and code to and from the computing system 500 of FIG. 5. The system software for implementing embodiments of the present technology may be stored on such a portable medium and input to the computing system 500 via the portable storage device 540.

Input devices 560 provide a portion of a user interface. Input devices 560 may include an alphanumeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computing system. Peripheral device(s) 580 may include a modem or a router.

The components provided in the computing system 500 of FIG. 5 are those typically found in computing systems that may be suitable for use with embodiments of the present technology and are intended to represent a broad category of such computer components that are well known in the art. Thus, the computing system 500 of FIG. 5 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

According to additional embodiments, the present technology may modify properties of a coating layer on a substrate. The property modification for a substrate coating layer may make it absorb at 1552 nm, or its harmonics, by adding either a single or a combination of chromophores. Modification may include selecting the additives such that the material allows the laser to ablate the material more efficiently, as well as using the additives to enhance edge contrast, i.e., allow sharpening of the image or pattern transferred into the coated layer. The coated layer with additives should also serve as a getter for any materials removed during the ablative process.

In one approach, the coated layer can be commonly used photoactive layer such as a photoresist pre mixed with the additives or a tailored formulation of a polymer or monomer matrix. The coating can be deployed by spin coating from a liquid matrix or deposited from the vapor phase by evaporation, sputtering, physical vapor deposition or through chemical techniques such as chemical vapor deposition ("CVD") or atomic layer deposition ("ALD"). In one variation, the masking layer can be an inorganic film such Silicon or metal, oxide or nitride layer or halogenated polymers. In another variation the layer could actually be a composite of several layers where the photoabsorbing layer can be a layer that is deposited on top of or sandwiched within the film stack.

The light source can be a laser of, ultrafast or otherwise, or a lamp deployed either directly or through imaging optics and apertures to create the desired features on the substrate. The feature generation can be in just the applied absorbing layer or can combine ablation into the underlying layers at the same time. In one variation, a pattern can be "opened" within the absorbing layer and underlying layers can be selectively removed through multiple passes The present technology enhances the quality and ability of laser emitting devices that generate 1552 nanometer wavelength laser beams (and harmonics) to ablate, modify, and texture surfaces. This may allow the deployment of these platforms on a variety of currently unaccessible applications. A resist layer coated on a semiconductor device wafer may be sensitized to absorb at laser beams having a wavelength of approximately 1552 nanometers so that light sources operating at this wavelength can have increased absorption into the materials and deliver enhanced fidelity, precision and productivity when scribing or dicing these wafers. This approach, in principle can be applied for a variety of manufacturing processes where a laser light source can be used to either create features (either through ablation or modification) or cause separation through continued ablation or other post processing techniques.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for selectively ablating a layered material, the method comprising:
   selectively varying a wavelength of at least a portion of a primary ultrafast laser beam to create a secondary ultrafast laser beam with a second wavelength, the primary ultrafast laser beam being configured to ablate a layer of the layered material, the secondary ultrafast laser beam being configured to ablate an additional layer of the layered material; and
   applying the primary and secondary ultrafast laser beams to the layered material to create a singulated product, wherein the secondary ultrafast laser beam ablates a getter layer of the layered material and the primary ultrafast laser beam ablates a device layer of the layered material.

2. The method according to claim 1, wherein the singulated product includes one or more ablated features.

3. The method according to claim 1, wherein the getter layer includes a polymer and the secondary ultrafast laser beam includes a wavelength that includes any of green, blue, or ultraviolet.

4. The method according to claim 1, wherein a wavelength of the primary ultrafast laser beam is substantially 1552 nanometers.

5. The method according to claim 1, further comprising modulating the wavelength of a portion of the primary ultrafast laser beam to generate the one or more secondary ultrafast laser beams, wherein the wavelength of each of the one or more secondary ultrafast laser beams is a harmonic of the wavelength of the primary ultrafast laser beam.

6. The method according to claim 1, wherein selectively varying includes:
   diverting at least a portion of the primary ultrafast laser beam into a secondary ultrafast laser beam; and
   modulating the wavelength of the secondary ultrafast laser beam.

7. The method according to claim 1, wherein the secondary ultrafast laser beam is replaceable with a laser beam having a pulse duration that is selected from any of, a nanosecond wave, a picosecond wave, a femtosecond wave, or combinations thereof, wherein the frequency of the laser beam is selectively adjustable.

8. The method according to claim 1, wherein applying includes:
   focusing the secondary ultrafast laser beam to a getter layer of the layered material;

traversing the secondary ultrafast laser beam along a tool path to ablate at least a portion of the getter layer; and focusing the primary ultrafast laser beam to a device layer along at least a portion of the tool path to ablate at least a portion of the device layer.

9. The method according to claim 8, wherein focusing includes creating an intensity profile for at least one of the secondary ultrafast laser beam and the primary ultrafast laser beam, the intensity profile including any of top-hat, Bessel, parabolic, super-Gaussian, irregular, and polygonal.

10. A system for selectively ablating layers of a layered material, the system comprising:
   at least one laser emitting source for emitting two or more ultrafast laser beams; and
   a beam delivery assembly for delivering the two or more ultrafast laser beams to the layered material, the beam delivery assembly comprising:
   an optical subassembly for selectively varying a focal point of each of the two or more laser beams in such a way that each of the two or more ultrafast laser beams ablate different layers of the layered material, wherein the two or more ultrafast laser beams have different harmonic wavelengths relative to one another, wherein a first one of the two or more ultrafast laser beam ablates a device layer of the layered material and a second one of the two or more the primary ultrafast laser beam ablates a getter layer of the layered material.

11. The system according to claim 10, wherein the beam delivery assembly further comprises a harmonic converter that converts the wavelength of an ultrafast laser beam from a fundamental wavelength to a harmonic wavelength thereof.

12. The system according to claim 10, wherein the at least one laser emitting source includes two or more laser emitting sources, each of the two or more laser emitting sources generating a laser beam having a particular wavelength.

13. The system according to claim 12, wherein a first laser beam of a first laser emitting source includes a first wavelength and wherein a second laser beam of a second laser emitting device includes a wavelength that is a harmonic of the first wavelength.

14. The system according to claim 10, wherein the optical sub assembly comprises a dichroic combiner that aligns two or more ultrafast laser beams into substantially collinear laser beams.

15. The system according to claim 14, wherein the optical sub assembly further comprises a dove prism that receives the substantially collinear laser beams from the dichroic combiner, wherein the dove prism is rotatable about a central axis to change an alignment direction of the substantially collinear laser beams.

16. The system according to claim 14, wherein the optical sub assembly further comprises a plurality of mirrors that are arranged in such a way that the plurality of mirrors approximates optical behavior of a dove prism when the substantially collinear laser beams are directed into the plurality of mirrors.

17. The system according to claim 14, wherein the optical sub assembly further comprises beam shaping optics that selectively adjust an intensity profile of at least one of the substantially collinear laser beams.

18. The system according to claim 17, wherein the intensity profile includes any of top-hat, Bessel, parabolic, super-Gaussian, irregular, and polygonal.

19. A system for singulating a layered material, the system comprising:
   a laser emitting source for emitting a primary laser beam having a fundamental wavelength;
   a beam splitter for diverting a portion of the laser beam into a harmonic converter that converts the portion of the laser beam into a secondary laser beam, the secondary laser beam having a wavelength that is a harmonic of the fundamental wavelength; and
   a laser combiner that receives the primary laser beam and the secondary laser beam and aligns the primary laser beam and the secondary laser beam in a substantially collinear relationship to one another, wherein the secondary laser beam ablates a getter layer of the layered material and the primary laser beam ablates a device layer of the layered material.

20. The system according to claim 19, further comprising an optical alignment member that receives the primary laser beam and the secondary laser beam from the laser combiner, the optical alignment member being rotatable about a central axis to transpose the substantially collinear relationship of the primary laser beam and the secondary laser beam.

* * * * *